E. W. COMFORT.
HUMIDITY REGULATOR.
APPLICATION FILED MAR. 14, 1908.
977,933.
Patented Dec. 6, 1910.
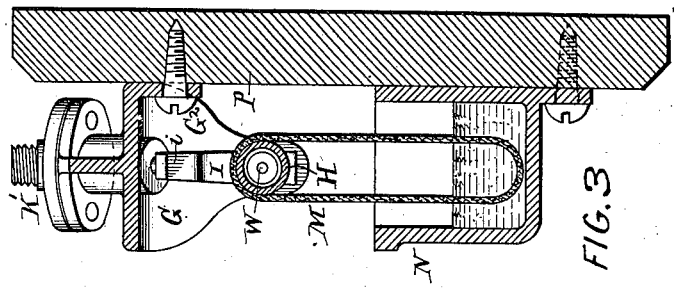
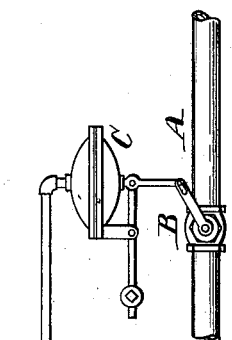
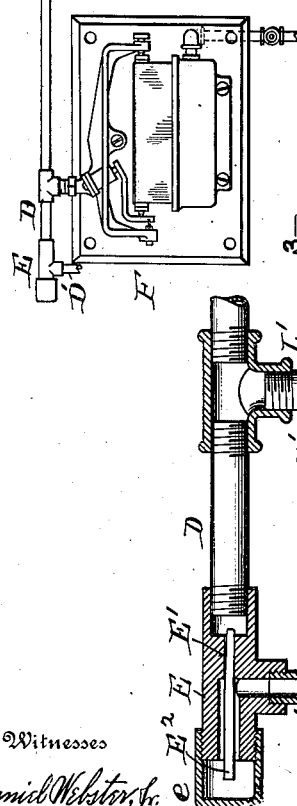
Witnesses
Daniel Webster, Jr.
A. M. Kelly
Inventor
Edward W. Comfort
By
Attorney

UNITED STATES PATENT OFFICE.

EDWARD W. COMFORT, OF PENSAUKEN TOWNSHIP, CAMDEN COUNTY, NEW JERSEY, ASSIGNOR TO WARREN WEBSTER & COMPANY, A CORPORATION OF NEW JERSEY.

HUMIDITY-REGULATOR.

977,933.  Specification of Letters Patent.  Patented Dec. 6, 1910.

Application filed March 14, 1908. Serial No. 421,166.

*To all whom it may concern:*

Be it known that I, EDWARD W. COMFORT, a citizen of the United States, and a resident of Pensauken township, county of Camden, State of New Jersey, have invented an Improvement in Humidity-Regulators, of which the following is a specification.

My invention has reference to humidity regulators, and consists of certain improvements which are fully set forth in the following specification, and shown in the accompanying drawings, which form a part thereof.

The object of my invention is to provide a suitable construction of humidity regulator for regulating a valve or controlling device which requires adjustment to correspond to varying conditions of humidity of air or gas, more especially for maintaining the said air or gas at a constant absolute humidity.

More particularly, my object is to provide a suitable humidity regulator adapted for use in connection with air purifying apparatus designed to supply purified air with a given degree of relative humidity to a room or building, and in which connection my improved device is adapted to automatically regulate the operation of the apparatus to correspond to all variations in the humidity of the treated air, either before or after it leaves the apparatus, whereby the humidity of the air delivered or to be delivered to the room or building shall remain practically constant and of that degree which has been predetermined by the adjustment of the purifying apparatus.

My invention consists of two bars or parts of expansible material adapted to jointly operate a valve-piece and one of said parts being acted upon by the temperature of the humidified air, combined with a fluid pressure vent for air or gas which controls the operation of a motor in the purifying or other apparatus, a tank below the other of the parts of expansible material, and an absorbent pad extending from the tank in contact with the last mentioned part of expansible material whereby said part may be maintained in a wet and cool condition.

My invention also consists of the foregoing features when the two expansible parts have different coefficients of expansion and in which the coefficients of expansion are such as to cause the control of the fluid pressure vent in substantially the same manner for all corresponding variations in the hygrometric condition of the air for different temperatures thereof.

My invention further consists in forming the humidity regulator with one of the expansible parts aforesaid acting as the carrier of the other of said parts and with an intermediate connection adapted to control the air or gas vent which controls the operation of the motor devices.

My invention also comprehends details of construction which, together with the features above specified, will be better understood by reference to the drawings, in which:—

Figure 1 is an elevation of a humidity regulator embodying my invention, shown in connection with the fluid pressure motor of a controlling valve; Fig. 2 is a front elevation of my improved humidity regulator with a portion in section; and Fig. 3 is a vertical section of the humidity regulator on line 3—3 of Fig. 2.

A represents a pipe or passage through which air, gas, steam or other fluid may be caused to pass and which may be necessary for the regulation of the heat, moisture, or other condition of the purifying apparatus, and B is the controlling valve thereof.

C is the motor for operating the valve, said motor being of any ordinary construction and usually consisting of a diaphragm moved in one direction by air pressure and in the other direction by a counterweight.

D D' is a pipe leading from the source of compressed air or other fluid pressure by which the motor C may be operated.

E is a pressure reducing device, and, as shown in Fig. 2, consists of a contracted passage E' and a plug $E^2$, usually made by employing a round wire with one side filed away to leave an exceedingly small aperture. This plug is inclosed by an air-tight cap $e$. In place of the plug $E^2$, an ordinary needle valve might be employed, but the plug is preferable because once it is made correctly and adjusted, it is not possible for the adjustment to be put out of order by undesirable handling. The pressure in the pipe D between the reducing device E and the motor C is very greatly less than in the pipe D' beyond the said reducing device and connecting with the compressor or other source of compressed air.

F is the humidity regulator embodying my improvements and is connected with the pipe D connecting with the motor C and the pressure reducing device E and operates as a relief valve to lower or raise the pressure in the motor C as may be required to properly operate the valve B.

Referring more particularly to Figs. 2 and 3, a wall plate or base P is provided with the various parts making up the humidity regulator apparatus and for conveniently holding them in position.

G is a casting of aluminum or other suitable material and is essentially inverted U shaped and provided with a central foot which is secured to the wall plate or base F by a screw $G^2$. The free ends of the part G extend downward, and one of said ends is provided with a centering screw G' and the other end supports a detachable plug I' carrying a spring hinge J, to which is attached the controlling valve lever I, the spring J being so connected with the lever that it normally causes its valve-piece $i$ to be held slightly away from the vent nozzle K, which is preferably formed on the part G. This vent K communicates with an upwardly extending tubular part K' which may be detachably secured to the pipe D by means of a coupling L'. It is evident that this nozzle K may be supported in any suitable manner, so long as the lever I coöperates with it.

Arranged below the horizontal portion of the part G, is a tubular expansible part H which is centered at one end on the screw G', and at the other end upon the lever I between the hinge J (which constitutes its pivot or fulcrum) and the valve nozzle K. For convenience, the connection between the tubular expansible part H and the lever I may be a pin W which has a collar to limit its outward movement and which is normally held in fixed position by a spring R. The pin W and the spring R are conveniently carried in a bushing L which is screwed into position upon the end of the tubular expansible part H. Normally the parts are in the condition shown in Fig. 2, and the pin W may be considered as immovable upon the part H. The object of the spring actuating pin W is to permit the expansion of the part H after the lever I is seated positively upon the nozzle K. When the valve-piece $i$ is not in contact with the nozzle K, the pin W may be considered as solid on the expansible tubular part H, but once it seats, then any further expansion of the tube H allows the bushing L to work upon the pin and compress, to more or less extent, the spring R. In this manner, no parts are strained or broken. The part H is preferably made of hard rubber, whereas the part G is preferably made of aluminum or other metal, the said parts having different coefficients of expansion, so that when changes of temperature occur, they conjointly cause an operation of the lever I, and hence of the valve-piece $i$ with respect to the nozzle K.

N is a vessel screwed to the plate or base F and adapted to contain water which may be supplied by the pipe O.

M is a pad of absorbent material such as felt or textile material and extends over the expansible part H with the ends dipped down into the water in the vessel N, so that the tube H is kept in a wet condition, so as to correspond to the wet bulb of a Mason hygrometer, whereas the aluminum casting or part G being dry will take the temperature of the dry bulb of the Mason hygrometer.

To secure the proper operation of the apparatus to suit variations in temperature under which the apparatus is to be operated to maintain a constant absolute humidity, it has been found that for practical purposes, the coefficient of expansion of the part G should be 1 as compared with $2\frac{1}{2}$ for the coefficient of expansion of the hard rubber tube H, and this is substantially fulfilled by making the part G of aluminum.

If the apparatus is to be employed for maintaining a constant relative humidity, the same general principles are embodied, only that in this case the relative expansions of the dry and wet elements G and H should be in proportions of 1 to $1\frac{1}{4}$. The general proportions just mentioned may be taken as considering the dry and wet elements as being of approximately the same length, but as it is not easy to arrange the dry element of a composition of the exact desired coefficient of expansion, relative to the coefficient of expansion of the wet element, I have found it more desirable to secure the proper relation between the expansibility of the two elements by properly proportioning their length and by employing a construction in which the dry element is to be aluminum and then reducing the length of the wet hard rubber element slightly with respect to the length of the dry element, the proper proportion may be secured which will give the exact relative actions between the two expansible elements to cause the valve lever to respond for any change in the relative humidity over a large range of varying temperatures and thus maintain the relative humidity substantially constant. In view of this properly proportioning the parts to correspond to the coefficients of expansion of the materials employed, I do not limit myself to any particular materials or any particular proportions of the parts, as these may be varied so long as they coöperate in operating the valve-piece to regulate the motor device under the variations in humidity for different temperatures according to whether the regulator is designed for responding to variations in absolute humidity or for relative humidity.

As it is important that the vent nozzle K shall be kept clean, and as it is of small size, and might readily become clogged by materials carried into it by the escaping air from the pipe D, I prefer that this nozzle K shall be provided with a chamber $K^2$ which may be filled with cotton or other porous material which will catch any particles of dirt and yet will not materially obstruct the escape of air through the vent nozzle when the valve-piece $i$ leaves said vent nozzle open.

It will be readily understood that, if the valve-piece $i$ closes the vent nozzle K, the pressure in the motor device will gradually increase until it is sufficient to operate the valve B. The valve $i$ and vent nozzle K therefore act as a relief valve device for reducing the pressure in the pipe D between the pressure reducing device E and the motor, and that this may be accomplished by the mechanism shown, the orifice of the nozzle K should be equal to or greater in area than the contracted orifice $E'$ in the reducing device through which the air passes.

In adjusting the humidity regulator, the screw $G'$ is adjusted until the valve-piece $i$ almost seats upon the valve, after which any variation in the temperature and hygrometric condition of the air, such as would be due to the lowering of the percentage of moisture therein, would cause the contraction of the two elements G and H, but with a greater contraction of the element H, the result of which is to remove the valve-piece $i$ from the vent nozzle K, thereby reducing the pressure in the pipe D and allowing the operation of the motor C. If this motor C is in properly organized apparatus, it may cause a restoration of the proper hygrometric condition of the atmosphere surrounding the humidity regulator, in which case the vent nozzle K will once more be closed, and the motor caused to operate to return to its normal position, namely, to prevent increase in the humidity. The difference in the expansion and contraction of the elements G and H is that which is called into play to control the valve lever I, and these varying conditions are caused by the conditions of humidity surrounding the humidity regulator; and whenever such conditions vary the humidity regulator automatically responds to control the devices which restore the hygrometric condition of the atmosphere surrounding the humidity regulator predetermined upon.

The humidity regulator may be used simply as a thermostat if so desired, if the condition of temperature is the important one; but the device is especially designed as a humidity regulator, and in practice may be located either in the purifier so as to be acted upon by the air after leaving the eliminator or by the air in the room or building after being delivered from the purifier, either with or without reheating. Whatever its location may be, the proper adjustment should be made to suit the conditions prevailing in the machine with respect to those required to be maintained.

While I have shown my invention in the form which I have found most excellently adapted for commercial use, the details thereof may be modified without departing from the spirit of the invention.

Having now described my invention, what I claim as new, and desire to secure by Letters Patent, is:—

1. In a humidity regulator, the combination of two expansible elements having different coefficients of expansion, a lever having a connection with each of the expansible elements so as to be oscillated by the joint action of said elements when expanded unequally, means to maintain one of the elements in a wet condition, and valve devices controlled by the lever.

2. In a humidity regulator, the combination of two long expansible elements having different coefficients of expansion connected together at one end, a lever having a connection with the free ends of each of the expansible elements so as to be oscillated by the joint action of said elements when expanded unequally under variations of the hygrometric condition of the surrounding atmosphere, means to maintain one of the elements in a wet condition, and valve devices controlled by the lever.

3. In a humidity regulator, the combination of two expansible elements having different coefficients of expansion, a lever having a connection with each of the expansible elements so as to be oscillated by the joint action of said elements when expanded unequally, means to maintain one of the elements in a wet condition, valve devices controlled by the lever, a motor controlled means for varying the atmospheric conditions, a pipe for supplying compressed air or gas to the motor and having a connection with the valve devices, and means for restricting the rapidity of flow of the air or gas to the motor and valve devices.

4. In a humidity regulator, the combination of a metal expansible element supported so as to freely expand in the direction of its length, a lever to control the operation of a motor device pivoted at one end to one end of the metal expansible element, a non-metallic expansible element having one end connected with the other end of the metal expansible element and having its other end jointed to the lever and also having a different coefficient of expansion from that of the metal expansible lever, and means for keeping one of the expansible elements wet.

5. In a humidity regulator, the combination of a metal expansible element supported so as to freely expand in the direction of its length, a lever to control the operation of a motor device pivoted at one end to one end of the metal expansible element, a non-metallic expansible element having one end connected with the other end of the metal expansible element and having its other end jointed to the lever and also having a different coefficient of expansion from that of the metal expansible lever, and means for keeping the non-metallic expansible element wet.

6. In a humidity regulator, the combination of a metal expansible element supported so as to freely expand in the direction of its length, a lever to control the operation of a motor device pivoted at one end to one end of the metal expansible element, a non-metallic expansible element having one end connected with the other end of the metal expansible element and having its other end jointed to the lever and also having a different coefficient of expansion from that of the metal expansible lever, means for adjusting the connection of two expansible elements so as to permit adjustment of the lever, and means for keeping one of the expansible elements wet.

7. In a humidity regulator, the combination of a metal expansible element supported so as to freely expand in the direction of its length, a lever to control the operation of a motor device pivoted at one end to one end of the metal expansible element, a non-metallic expansible element having one end connected with the other end of the metal expansible element and having its other end jointed to the lever by means of a yielding connection and also having a different coefficient of expansion from that of the metal expansible lever, and means for keeping one of the expansible elements wet.

8. In a humidity regulator, the combination of a metal expansible element supported so as to freely expand in the direction of its length, a lever to control the operation of a motor device pivoted at one end to one end of the metal expansible element, a non-metallic expansible element having one end connected with the other end of the metal expansible element and having its other end jointed to the lever by means of a yielding connection consisting of a spring actuated pin and also having a different coefficient of expansion from that of the metal expansible lever, and means for keeping one of the expansible elements wet.

9. In a humidity regulator, the combination of an inverted U shaped metallic expansible element having an air vent provided with a tubular extension for connection with an air pipe, a lever for controlling said air vent having an operative connection with one end of the U shaped metallic expansible element, a second expansible element having a different coefficient of expansion than the first mentioned expansible element having one end in operative connection with the lever to move it and its other end in connection with the other end of the U shaped metallic expansible element, and means for keeping one of said elements wet.

10. In a humidity regulator, the combination of an inverted U shaped metallic expansible element having an air vent provided with a tubular extension for connection with an air pipe, a lever for controlling said air vent having an operative connection with one end of the U shaped metallic expansible element, to normally hold it away from the vent, a second expansible element having a different coefficient of expansion than the first mentioned expansible element having one end in operative connection with the lever to move it to close the vent and its other end in adjustable connection with the other end of the U shaped metallic expansible element, and means for keeping one of said elements wet.

11. Means for controlling the operation of a motor device by the variations of the conditions of the air consisting of a valve device, and two expansible bodies having different coefficients of expansion for maintaining the valve device in normal position for a given condition of air one of said expansible bodies being maintained in a dry condition and the other in a wet condition.

12. Means for controlling the operation of a motor device by the variations of the conditions of the air consisting of a valve device, two expansible bodies having different coefficients of expansion for maintaining the valve device in normal position for a given condition of air one of said expansible bodies being maintained in a dry condition and the other in a wet condition, and means for adjusting said expansible bodies to suit different normal conditions of the air.

13. Means for controlling the operation of a motor device by the variations of the conditions of the air consisting of a valve device, two expansible bodies for maintaining the valve device in normal position for a given condition of air one of said expansible bodies being maintained in a dry condition and the other in a wet condition, and means for adjusting said expansible bodies to suit different normal conditions of the air consisting of a pivot screw carried by one of the expansible bodies and upon which the other expansible body is pivoted.

14. A motor device combined with means for controlling the operation of the motor device by the variations of the conditions of the air consisting of a valve device to control the motor, two expansible bodies having different coefficients of expansion coöperating for maintaining the valve device in normal position for a given condition of air one of said expansible bodies being maintained in a dry and the other in a wet condition by water supplied to it by a pad and tank, a water tank adjacent to the wet expansible body, and a wet pad in contact with said wet expansible body and extending into the tank.

15. Means for controlling the operation of a motor device by the variations of the conditions of the air consisting of a controlling device for the motor device, a dry expansible body having one coefficient of expansion, a wet expansible body having a different coefficient of expansion than that of the dry expansible body, and means for operating the controlling device in operative connection with the free ends of both expansible bodies.

16. Means for controlling the operation of a motor device by the variations of the conditions of the air consisting of a controlling device for the motor device, a dry expansible body, a wet expansible body, and means for operating the controlling device in operative spring connection with the free ends of both expansible bodies.

In testimony of which invention, I have hereunto set my hand.

EDWARD W. COMFORT.

Witnesses:
JACOB M. HALL,
WM. Z. R. BROEMER.